Patented Feb. 7, 1933

1,896,344

UNITED STATES PATENT OFFICE

HENRY K. BENSON, OF SEATTLE, WASHINGTON

PROCESS OF MANUFACTURING WOOD PULP IN MULTIPLE STAGES

No Drawing.   Application filed June 22, 1931.   Serial No. 546,166.

My invention relates to improvements in making pulp from wood chips with progressively spent liquor in successive but distinct stages each of which permits of definite and specific functions and in one of which mechanical abrasion is employed.

It is well known in the art of pulping wood that the first step is the expulsion of air in the chips and the wetting of the surface for the introduction of the reagents. To accomplish penetration, fresh cooking liquor is added, heated under pressure, with occasional release of air and gases. This results in loss of heat and in some cases of the reagent. After impregnation the cooking liquor gradually dissolves the encrusting substances from the fibers and is progressively diluted in its active constituents, and finally is discharged as waste together with suspended fibers. All of the heat contained at the end of the cook is lost together with some of the pulp. Furthermore, in the alkaline process, too high a content of caustic soda, and in the acid process, the development of free sulfuric acidity both produce degraded and deteriorated pulp by reason of contact with spent liquor containing these reagents. In the present art of making pulp, it is obvious, therefore, that heat and material losses occur both at the beginning and at the end of the process and the removal of fiber encrusting substance proceeds slowly by diffusion of the cooking liquor to new surfaces thus exposed.

To overcome these losses, I have found it advantageous to reverse the ordinary application of the liquor by adding fresh, cold, cooking liquor to the hot, nearly cooked batch of pulp. By the transfer of heat from the pulp to this liquor, final purification and refining of the pulp occurs at a moderate temperature with minimum degradation and with good bleachability. I have found that if mechanical agitation and abrasion are employed during the main cooking stage, the digestion can materially be accelerated and the plurality of digestors employed in continuous and cascade systems of digesting can be reduced to three, thus effecting a number of economies. The simplification of installation, the saving of heat in two stages, the shortening of the time of cooking in one stage and the removal of pulp in another stage from detrimental impurities of the spent liquor, constitute the improvement over the present act which my process accomplishes.

I have found that exhausting the air from a sealed digester charged with chips and then admitting hot, nearly spent liquor, produce active boiling under diminished pressure and that the air contained in the chips is replaced by spent liquor. Two important results are accomplished by this practice: (1) complete impregnation and (2) heat transfer from spent liquor to chips. In the next stage after the chips have been freed from excess spent liquor, the main cooking occurs under mechanical agitation with simultaneous abrasion by means of rods, balls or other appliances. The main results accomplished in this stage is the shortening of time of cooking because of removal of encrusting substances and of constant exposure of new surfaces to the chemical reagent. In the final stage, after the separation of the pulp from the cooking liquor, cold fresh liquor is added to the partially cooked hot pulp. Two results are accomplished, (1) heat transfer from pulp to fresh cooking liquor and (2) refining and purification of the pulp with liquor whose composition is controlled to prevent detrimental effects of sulfuric acidity, or of causticity, on the newly formed fibers.

From this description it can be seen that the novelty of my process resides in: (1) The reversal of treatment of chips with liquor in controlled stages starting with nearly spent and ending with fresh liquor; (2) the use of mechanical aids to separate the fibers during cooking stages; (3) the heat transfer by heating cold chips with hot liquor from the main cook; (4) the heat transfer by heating cold liquor in the final stages with hot pulp from the main cook.

While the prior art (Ger. Pat. 499,010) discloses other processes where "the raw materials and liquor for the decomposition move in opposite directions," my process differs in that such reverse flow is utilized for the creation of definite stages each under complete mechanical and chemical control of pulp making and in one of which stages mechanical abrasion is employed.

It is obvious that several alternative modes of operating the above described process are possible. First, a system of rotating digesters can be used and both the wood and liquors can be separated and transferred at the completion of each stage; second, a single revolving digester can be used, its contents can be removed at the end of each stage, for treatment as desired for the next stage; and third, the stationary digesters now used in the industry can be operated in series of three or more by providing for the discharge and separation of reacting substances at end of each stage.

It should be noted that the process above described permits variations in liquor content impossible in the present art. It is generally recognized, for example, in the sulfate process that the action of caustic soda at the end of the cook is harmful to the fibers and to prevent such deterioration, the less drastic sodium sulfide is added to the charge at the beginning. In my process wherein mechanical agitation and abrasion are employed to shorten the time, the nearly cooked pulp can be treated with "green liquor" ($Na_2CO_3$ and $Na_2S$) and the main cook with "white liquor" ($Na_2S$ and $NaOH$).

The following is a more detailed description of application of my process, of cooking in multiple batch stages. Chips and sulphite acid are charged into a revolving digester of acid resisting, metal construction. The air is next evacuated and hot, nearly spent liquor from a second digester is admitted. The temperature of the hot liquor is substantially 100° C. but is rapidly lowered by the cold chips in the revolving digester to substantially 80° C. Under diminished pressure active boiling occurs and more air is expelled from the chips. Upon further cooling, the liquor penetrates the chips and this treatment is complete in substantially one hour.

The chips are now separated from the excess spent liquor, which is discarded. The chips are then transferred to a rotary digester supplied with acid resisting metal rods, and nearly fresh sulfite cooking liquor is added. The temperature and pressure are gradually raised to substantially 120° C. and 75 pounds respectively at the end of the cook. The contents of the digester are next passed over a heat insulated rotary filter and the thickened pulp is discharged into a rotary digester containing fresh cold sulfite acid of the usual composition. After agitation, the pulp is again passed over a rotary filter and thickened after which it passes over the mill screens and deckers in the usual way.

It is obvious that in commercial procedure and with other species, the precise conditions above described will not apply, but must be varied to yield the desired pulp. All such variations, however, involving treatment of chips in controlled multiple batch stages in one of which mechanical abrasion is employed, with progressively spent liquor, fall within the scope of my claims.

I claim:

1. Improvements in processes of manufacturing wood pulp, comprising heating wood chips with progressively lesser spent reactive liquor, in multiple batch stages, and mechanically abrading the chips in the intermediate stages.

2. Improvements in processes of manufacturing wood pulp, comprising as the first stage, the heating of cold wood chips with hot nearly spent cooking liquor which has been separated from the intermediate stages; as the intermediate stages abrading and heating of chips from the first stage with lesser spent liquor from the final stage; and as the final stage the treatment of hot pulp from the intermediate stages with cold fresh liquor.

3. Improvements in processes of manufacturing wood pulp comprising the mechanical abrading of wood chips during one of the multiple batch stages of cooking, substantially as described.

4. Improvements in processes of manufacturing wood pulp comprising the digestion of wood chips with partially spent reactive liquor in the first stages and abrading the chips during the cooking of the chips in the intermediate stage with nearly fresh cooking liquor.

5. Improvements in processes of manufacturing wood pulp comprising the digestion of wood chips in the first stages, their mechanical abrasion in the intermediate stages and cooking with nearly fresh reactive liquor and the completion of digestion in the last stages by heating with fresh cooking liquor.

HENRY K. BENSON.